United States Patent
Lim et al.

(10) Patent No.: US 9,249,728 B2
(45) Date of Patent: Feb. 2, 2016

(54) POWER GENERATION SYSTEM AND POWER GENERATION METHOD

(75) Inventors: Chan-Sun Lim, Changwon (KR); Myeong-Hyo Kim, Changwon (KR); Jong-Sub Shin, Changwon (KR); Young-Chang Shon, Changwon (KR); Jeong-Hun Lee, Changwon (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 107 days.

(21) Appl. No.: 13/468,218

(22) Filed: May 10, 2012

(65) Prior Publication Data
US 2013/0001948 A1 Jan. 3, 2013

(30) Foreign Application Priority Data
Jun. 30, 2011 (KR) ........................ 10-2011-0065132

(51) Int. Cl.
*F02C 7/08* (2006.01)
*F02C 6/16* (2006.01)

(52) U.S. Cl.
CPC ... *F02C 7/08* (2013.01); *F02C 6/16* (2013.01); *Y02E 60/15* (2013.01)

(58) Field of Classification Search
CPC ..................................... F02C 6/16; F02C 7/08
USPC ................... 60/641.1–659; 290/1–4
See application file for complete search history.

(56) References Cited

U.S. PATENT DOCUMENTS

| | | | | |
|---|---|---|---|---|
| 3,831,373 A * | 8/1974 | Flynt ................................ | 60/802 |
| 3,866,058 A * | 2/1975 | Lenssen .......................... | 290/52 |
| 4,406,118 A * | 9/1983 | Funk .................... | B01D 53/002 |
| | | | | 60/39.183 |
| 4,765,142 A * | 8/1988 | Nakhamkin .......... | F01K 21/047 |
| | | | | 60/652 |
| 5,181,376 A * | 1/1993 | Rao ........................ | F01K 21/047 |
| | | | | 60/39.182 |
| 5,363,642 A * | 11/1994 | Frutschi et al. ................. | 60/774 |
| 5,379,589 A * | 1/1995 | Cohn et al. .................... | 60/39.59 |
| 5,448,889 A * | 9/1995 | Bronicki ..................... | 60/641.14 |
| 5,491,969 A * | 2/1996 | Cohn ....................... | F01B 17/00 |
| | | | | 60/775 |
| 5,778,675 A * | 7/1998 | Nakhamkin ..................... | 60/652 |
| 6,276,123 B1 * | 8/2001 | Chen et al. ...................... | 60/786 |
| 7,669,423 B2 | 3/2010 | Nakhamkin | |
| 7,900,455 B2 * | 3/2011 | Althaus et al. .................. | 60/727 |
| 2003/0033810 A1 * | 2/2003 | Kreitmeier ................ | F02C 6/14 |
| | | | | 60/772 |

(Continued)

FOREIGN PATENT DOCUMENTS

| | | | |
|---|---|---|---|
| JP | 733084 A | 2/1995 | |
| JP | 7332109 A | 12/1995 | |

(Continued)

*Primary Examiner* — Thomas Denion
*Assistant Examiner* — Shafiq Mian
(74) *Attorney, Agent, or Firm* — Sughrue Mion, PLLC

(57) ABSTRACT

A power generation system includes a compression unit which compresses a gas, a storage which stores the compressed gas output from the compression unit, a first expansion unit which generates first power and outputs a first exhaust gas, a heating unit which heats at least the stored gas output from the storage, a second expansion unit which generates second power and outputs a second exhaust gas, a first regenerator which performs a first heat exchange between the second exhaust gas and the stored gas output from the storage, to generate a first heat exchange gas used to generate the first power and a first regenerator gas, and a second regenerator which performs a second heat exchange between the first exhaust gas and the first regenerator gas to generate a second heat exchange gas used to generate the second power after heated at the heating unit.

21 Claims, 4 Drawing Sheets

(56) References Cited

U.S. PATENT DOCUMENTS

| | | | |
|---|---|---|---|
| 2003/0033812 A1* | 2/2003 | Gerdes | F02C 6/16 60/772 |
| 2005/0178114 A1* | 8/2005 | Althaus | F02C 6/16 60/407 |
| 2008/0272597 A1* | 11/2008 | Althaus | F01D 19/00 290/52 |
| 2009/0178384 A1* | 7/2009 | Nakhamkin | F02C 6/16 60/39.183 |
| 2010/0038917 A1* | 2/2010 | DiAntonio et al. | 290/4 C |
| 2010/0083660 A1* | 4/2010 | Nakhamkin | 60/652 |
| 2010/0176602 A1* | 7/2010 | Shinnar | 290/1 A |
| 2011/0016864 A1* | 1/2011 | Wright et al. | 60/650 |
| 2011/0100010 A1* | 5/2011 | Freund et al. | 60/659 |
| 2011/0113781 A1* | 5/2011 | Frey et al. | 60/659 |
| 2011/0132032 A1* | 6/2011 | Gatti et al. | 62/615 |
| 2011/0154822 A1* | 6/2011 | Protz | F01K 19/08 60/651 |

FOREIGN PATENT DOCUMENTS

| | | |
|---|---|---|
| JP | 8128331 A | 5/1996 |
| JP | 1113480 A | 1/1999 |

\* cited by examiner

POWER GENERATION SYSTEM AND POWER GENERATION METHOD

CROSS-REFERENCE TO RELATED PATENT APPLICATION

This application claims priority from Korean Patent Application No. 10-2011-0065132, filed on Jun. 30, 2011, in the Korean Intellectual Property Office, the disclosure of which is incorporated herein by reference in its entirety.

BACKGROUND

1. Field

Apparatuses and methods consistent with exemplary embodiments relate to a power generation system, and more particularly, to a power generation system using compressed gas.

2. Description of the Related Art

A power generation system using compressed gas stores gas that is compressed using an apparatus such as a compressor in a predetermined storage space. When energy is needed, for example, to generate power by driving a turbine, the power generation system uses the compressed gas from the predetermined storage pace. The power generation system also may be used as a power system for generating electric power. In general, an electricity consumption rate is relatively low during at late night (i.e. after midnight) and the electricity consumption rate is high during daytime. Therefore, if the power system compresses and stores gas by using surplus electric power after midnight and then generates electric power using the stored compressed gas at daytime, waste of energy may be reduced. Also, since electric power may be generated when necessary, the power system has a merit of controlling the amount of generation of electric power according to a varying electric power consumption rate.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a power generation system with an efficient structure using compressed gas.

According to an aspect of an exemplary embodiment, a power generation system includes a compression unit compressing gas and the compression unit comprising at least one compressor, a storage space storing gas output from the compression unit, a first expansion unit generating power using gas output from the storage space, a heating unit heating gas output from the first expansion unit, a second expansion unit generating power using gas output from the heating unit, a first regenerator provided on a conduit connecting the storage space and the first expansion unit and performing heat exchange between gas output from the second expansion unit and gas before entering the first expansion unit, and a second regenerator provided on a conduit connecting the first expansion unit and the heating unit and performing heat exchange between the gas output from the second expansion unit and gas before entering the heating unit.

The first expansion unit may also include a pressure control device.

The power generation system may further include a first connection unit that connects conduits connected to the storage space, the first regenerator, and the heating unit. The power generation system may further include a first temperature sensor that is installed on a conduit connecting the second expansion unit and the first regenerator and measures a temperature of the gas output from the second expansion unit, wherein, when the temperature of the gas measured by the first temperature sensor does not reach a first temperature, the gas output from the storage space is transferred to the heating unit from the first connection unit. A throttle valve may be provided on a conduit connecting the first connection unit and the heating unit.

The power generation system may further include a second connection unit connecting conduits that are connected to the first regenerator, the first expansion unit, and the second regenerator. The power generation system may further include a second temperature sensor that is installed on a conduit connecting the first regenerator and the second connection unit and measures a temperature of the gas output from the first regenerator, wherein, when the temperature of the gas measured by the second temperature sensor does not reach a second temperature, the gas output from the first regenerator is transferred to the second regenerator from the second connection unit.

The power generation system may further include a control unit that controls closing and opening of a conduit through which the gas is transferred.

The power generation system may further include a cooling unit that is installed on a conduit connecting the compression unit and the storage space and cooling the gas compressed in the compression unit.

The first expansion unit and the second expansion unit may be connected in parallel with each other. The power generation system may further include a gear unit that is connected to a rotational shaft of the first expansion unit and a rotational shaft of the second expansion unit and transferring a rotational force received from the rotational shafts to another rotational shaft. The gear unit may include a first gear connected to the rotational shaft of the first expansion unit, a second gear connected to the rotational shaft of the second expansion unit, and a third gear engaged with the first and second gears and rotating.

The first expansion unit and the second expansion unit may be connected in series with each other.

The power generation system may further include a first clutch that is installed on a rotational shaft of the first expansion unit and selectively disconnects transfer of a rotational force of the first expansion unit to the outside.

A pressure of the gas stored in the storage space may be maintained constant.

The power generation system may further include an electricity generation unit that converts the power generated by the first or second expansion unit into electric power.

The compression unit may include a first compression unit compressing gas until the gas reaches a first pressure, and a second compression unit receiving the gas compressed by the first compression unit and compressing the gas until a pressure of the storage space reaches a second pressure. In a power generation operation using the compressed gas, when a pressure of compressed gas output from the storage space does not reach a third pressure, the compressed gas output from the storage space may be transferred to the second compression unit to be compressed.

According to another aspect of the exemplary embodiment, a power generation method includes compressing gas (Compression operation), storing compressed gas in a storage space (Storage operation), performing heat exchange between gas output from the storage space and gas output from a second expansion unit (First heat exchange operation), generating power at a first expansion unit using gas output from the storage space and passing through the first heat exchange operation (First power generation operation), performing heat exchange between gas passing through the first power generation operation and gas output from the second expansion unit and passing through the first heat exchange operation (Second heat exchange operation), heating gas passing through the first power generation operation and the second heat exchange operation (Heating operation), and generating power at the second expansion unit using gas passing through the heating operation (Second power generation operation).

BRIEF DESCRIPTION OF THE DRAWINGS

The above and other aspects will become more apparent by describing in detail exemplary embodiments with reference to the attached drawings, in which.

DETAILED DESCRIPTION OF THE INVENTION

Figure 1:
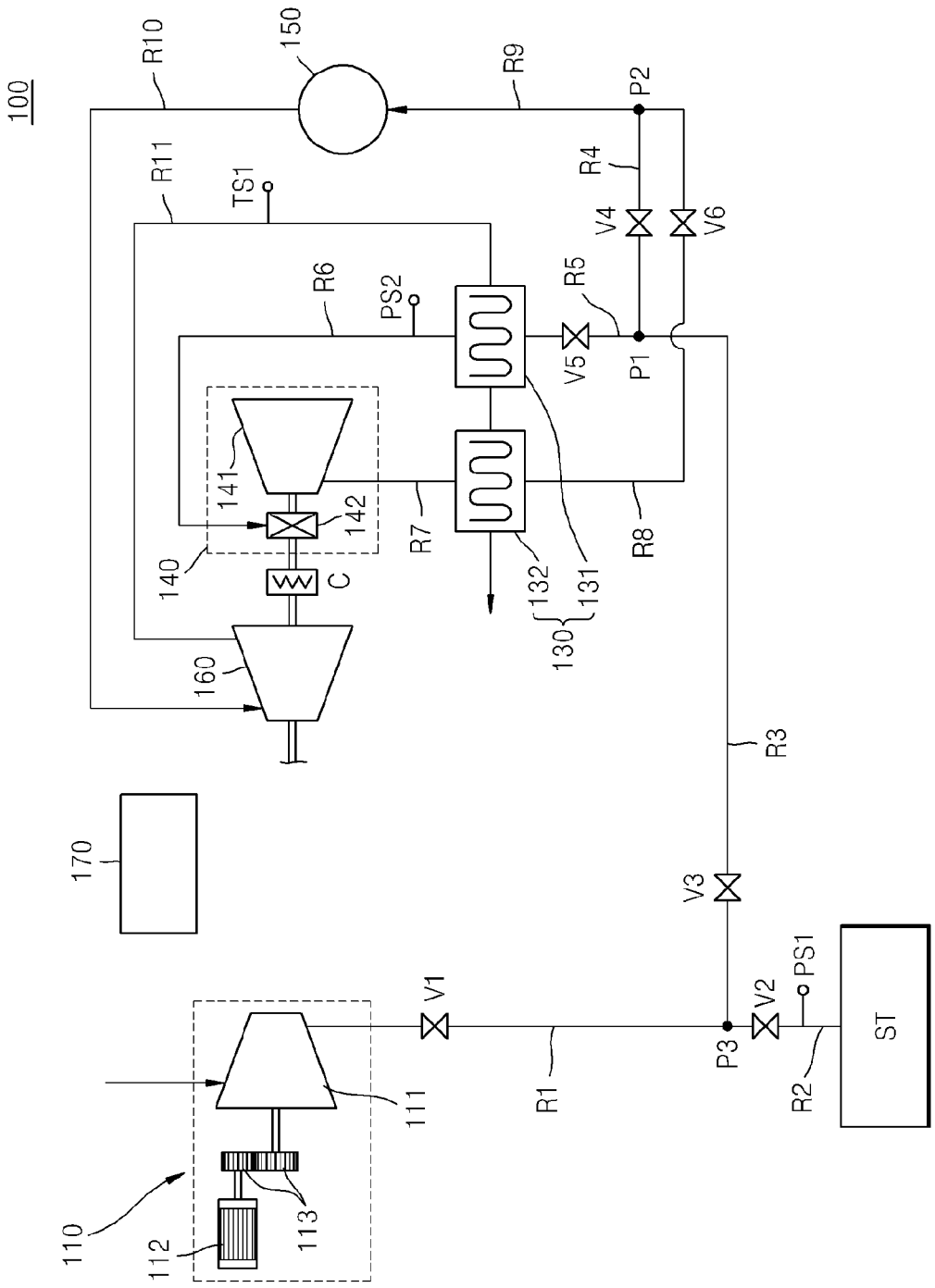
FIG. 1 schematically illustrates a power generation system according to an exemplary embodiment.

Hereinafter, exemplary embodiments will be described in detail with reference to the attached drawings. In the drawings, like reference numerals in the drawings denote like elements.

FIG. 1 schematically illustrates a power generation system 100 according to an exemplary embodiment. Referring to FIG. 1, the power generation system 100 according to the exemplary embodiment includes a compression unit (not shown), a storage ST, a regenerative unit 130, a first expansion unit 140, a heating unit 150, and a second expansion unit 160, and may further include a control unit 170. If the power generation system 100 according to the exemplary embodiment further includes an electricity generation unit (not shown) for generating electric power using the power generated by the power generation system 100, the present system may be regarded as an "electricity generation system", which will be described in detail in another embodiment.

In the power generation system 100, a compressed gas stored in the storage ST has a composition of air. However, the exemplary embodiment is not limited thereto. When the compressed gas is heated to a high temperature without passing through a combustion operation at the heating unit 150, most gases can be the gas of the exemplary embodiment. When the compressed gas passes through the combustion operation at the heating unit 150, the gas of the exemplary embodiment may be formed of a combustible gas component. A composition of the compressed gas may be not only air consisting of nitrogen of 78%, oxygen of 21%, argon of 0.93%, carbon dioxide, moisture, etc. but also any combustible gas formed of, for example, nitrogen of 50%, oxygen of 45%, etc. That is, any gas having a composition capable of generating the combustion operation may be used as the compressed gas of the exemplary embodiment.

The compression unit includes a first compression unit 110. In the current exemplary embodiment, the compression unit includes the first compression unit 110 only. However, the compression unit may include a plurality of compression units if necessary.

The first compression unit 110 includes a first compressor 111, a first motor 112, and a first decelerator 113. A turbo compressor, a rotary compressor, or a reciprocating compressor may be used as the first compressor 111. An inlet portion (not shown) of the first compressor 111 is connected to the outside, whereas an outlet portion (not shown) thereof is connected to a first conduit R1. The first compressor 111 includes one compressor, but the exemplary embodiment is not limited thereto. That is, the first compression unit 110 may include a plurality of compressors. In this case, the plurality of compressors may be connected in series or in parallel.

The first compression unit 110 compresses a gas to a first pressure. The first pressure that corresponds to an optimal pressure ratio of the first compressor 111 may be adjusted at any time according to design intent of a designer.

The first motor 112 receives electric power from an electric power network or an electricity generation unit (not shown) and drives the first compressor 111. An alternating current (AC) or direct current (DC) motor may be used for the first motor 112.

Although, in the exemplary embodiment, the first motor 112 is used to drive the first compressor 111, the exemplary embodiment is not limited thereto. For example, the first compressor 111 may compress air by receiving power through a rotational shaft of the first or second expansion unit 140 or 160.

The first decelerator 113 transfers the power of the first motor 112 to a shaft of the first compressor 111. In the current exemplary embodiment, the first decelerator 113 is embodied by a gear train.

The storage ST is used to store the compressed gas. A reservoir tank may be used as the storage ST and may be installed on the ground or under the ground.

The regenerative unit 130 includes a first regenerator 131 and a second regenerator 132. The first regenerator 131 is installed on a conduit connecting the storage ST and the first expansion unit 140, and performs heat exchange between a high temperature exhaust gas exhausted from the second expansion unit 160 and the compressed gas output from the storage ST.

The second regenerator 132 is installed on a conduit connecting the first expansion unit 140 and the heating unit 150, and performs heat exchange between a gas exhausted from the second expansion unit 160 and passing through the heat exchange at the first regenerator 131 and a gas output from the first expansion unit 140.

The first and second regenerators 131 and 132 both may be closed regenerators to prevent a gas for dissipating heat and a gas for absorbing heat from being mixed with each other.

Although in the exemplary embodiment the gas output from the second expansion unit 160 is designed to sequentially pass through the first regenerator 131 and the second regenerator 132, the exemplary embodiment is not limited thereto and the order may be reversed.

The first expansion unit 140 includes a turbine 141. A gas that is heated while passing through the first regenerator 131 expands in the turbine 141 to rotate a rotational shaft of the turbine 141, thereby generating power.

The turbine 141 may include a pressure control device 142. As the gas stored in the storage ST is exhausted for the generation of power, the pressure of the gas remaining in the storage ST decreases. When the gas pressure decreases, the number of gas molecules per unit volume decreases, which leads to a decrease in an amount of gas flow exhausted per unit hour. The first expansion unit 140 uses a turbine including the pressure control device 142 disposed at around an inlet of the turbine for controlling a pressure and a flow rate accompanying thereto to produce a constant output.

The pressure control device 142 according to the exemplary embodiment includes, for example, a variable vein or a variable nozzle. For example, when a gas flow rate is small, the vein is moved in a direction to decrease a cross-section of a gas inlet of the turbine 141 so that the volume of the gas decreases and the pressure of the gas increases, thereby increasing the flow rate. However, the pressure control device of the exemplary embodiment is not limited thereto and may be replaced by a variety of structures having the same function.

The heating unit 150 heats a gas so that a high temperature gas is exhausted. The heating unit 150 may include a combustor that generates a combusted high temperature and high pressure gas by supplying fuel to the compressed gas and generating the combustion operation. However, the exemplary embodiment is not limited thereto. A variety of methods of heating gas such as performing heat exchange with a high temperature material or using heat generated by electrical friction, without combustion, may be applied to the heating unit 150.

The second expansion unit 160 includes a single turbine. However, the exemplary embodiment is not limited thereto, and a plurality of gas turbines may be included. The turbines may be arranged in series or in parallel. A re-heater (not shown) may be included between the respective turbines. The second expansion unit 160 converts expansion energy of a high temperature and high pressure gas output from the heating unit 150 into rotational kinetic energy.

Although, in the exemplary embodiment, the first expansion unit 140 and the second expansion unit 160 are connected in series to each other, the exemplary embodiment is not limited thereto. The first expansion unit 140 and the second expansion unit 160 may be connected in parallel with each other, which will be discussed through another exemplary embodiment.

Since the first expansion unit 140 and the second expansion unit 160 that are connected in series, they share a single rotational shaft. Therefore, the shaft of the first expansion unit 140 and the second expansion unit 160 rotate at the same rotation speed. However, since an output of the first expansion unit 140 may not be constant depending on the state of the gas, when the output generated by the first expansion unit 140 is small, a total output generated by the power generation system 100 may decrease due to the first expansion unit 140. To address this matter, a clutch C is installed on the rotational shaft connecting the first expansion unit 140 and the second expansion unit 160. Thus, when an output of the first expansion unit 140 is small, the clutch C decouples the connection, and thus, only the second expansion unit 160 is operated, thereby increasing overall efficiency.

The control unit 170 includes electric circuits, integrated circuits (IC) chips, etc. and performs an operation according to a program operating the power generation system 100. A detailed control operation of the control unit 170 will be described below.

A configuration of a plurality of conduits in the power generation system 100 is described in detail with reference to FIG. 1. First, the configuration of the plurality of conduits related to a gas compression operation is described. In the exemplary embodiment, a plurality of conduits from the first compression unit 110 to the first regenerator 131 includes the first conduit R1, a second conduit R2, and a third conduit R3.

The first conduit R1 connects the first compression unit 110 and a third connection unit P3. The second conduit R2 connects the third connection unit P3 and the storage ST. The third conduit R3 connects the third connection unit P3 and a first connection unit P1.

A first valve V1 is arranged on the first conduit R1. A second valve V2 and a first pressure sensor PS1 are arranged on the second conduit R2. A third valve V3 is arranged on the third conduit R3.

A configuration of a conduit related to power and electric power generation operations using a compressed gas according to the exemplary embodiment will be described below.

In the exemplary embodiment, a plurality of conduits from the first connection unit P1 to the second regenerator 132 includes a fourth conduit R4, a fifth conduit R5, a sixth conduit R6, a seventh conduit R7, an eighth conduit R8, a ninth conduit R9, a tenth conduit R10, and an eleventh conduit R11.

The fourth conduit R4 connects the first connection unit P1 and a second connection unit P2. The fifth conduit R5 connects the first connection unit P1 and the first regenerator 131. The sixth conduit R6 connects the first regenerator 131 and the first expansion unit 140.

Also, the seventh conduit R7 connects the first expansion unit 140 and the second regenerator 132. The eighth conduit R8 connects the second regenerator 132 and the second connection unit P2. The ninth conduit R9 connects the second connection unit P2 and the heating unit 150. The tenth conduit R10 connects the heating unit 150 and the second expansion unit 160. The eleventh conduit R11 connects the second expansion unit 160 and the first regenerator 131.

A fourth valve V4 is arranged on the fourth conduit R4. A fifth valve V5 is arranged on the fifth conduit R5. A second pressure sensor PS2 is arranged on the sixth conduit R6. A sixth valve V6 is arranged on the eighth conduit R8. A first temperature sensor TS1 is arranged on the eleventh conduit R11.

Although the configurations of the conduits and the sensors according to the exemplary embodiment are described above, the configurations of internal conduits and sensors of the power generation system according to the exemplary embodiment are not limited thereto. That is, the configurations of the internal conduits and sensors of the power generation system according to the exemplary embodiment are not limited to the above-described configurations and may be variously modified according to designer's intention. Such modification includes types and specifications of internal devices to be arranged.

An operation of the power generation system 100 according to the exemplary embodiment will be described below with reference to FIG. 1. A storage operation of the power generation system 100 according to the exemplary embodiment will be first described. As described above, the following description will be based on that the compressed gas is air.

When a user inputs a compressed air storing command to the control unit 170, the control unit 170 determines whether a pressure in the storage ST measured by the first pressure sensor PS1 is greater than or equal to a first pressure which is approximately 50 bars in the exemplary embodiment (Determination operation A). If the measured pressure is less than the first pressure, the control unit 170 closes the third valve V3 and opens the first valve V1 and the second valve V2. The control unit 170 operates the first motor 112 to rotate the first compressor 111 via the first decelerator 113, thereby obtaining and compressing external air (Compression operation).

Then, the compressed air in the Compression operation is transferred to the storage ST and stored therein (Storage operation).

When the pressure of the storage ST measured by the first pressure sensor PS1 reaches the first pressure that is about 50 bars, the control unit 170 stops the operation of the first compression unit 110, and closes the first valve V1, the second valve V2, and the third valve V3, thereby terminating the Storage operation.

Although in the exemplary embodiment the first pressure is set to be about 50 bars, the exemplary embodiment is not limited thereto. That is, the first pressure may vary according to the internal structure of an overall power generation system and a design intent of a designer. In particular, the first pressure may vary according to performance of the compression unit.

Next, in the power generation operation, when a user inputs a power generation command to the control unit 170, the control unit 170 opens the second and third valves V2 and V3 and closes the first valve V1 so that the compressed air stored in the storage ST is transferred to the first connection unit P1 via the second and third conduits R2 and R3. Simultaneously or subsequently, the control unit 170 determines whether a temperature of the air measured by the first temperature sensor TS1 is greater than or equal to a first temperature that is approximately 150° C. (Determination operation B). When the measured temperature is lower than the first temperature, the control unit 170 closes the fifth valve V5, and opens the fourth valve V4.

The compressed air arrived at the first connection unit P1 is input to the heating unit 150 via the fourth and ninth conduits R4 and R9. The compressed air heated to a high temperature at the heating unit 150 is input to the second expansion unit 160 via the tenth conduit R10. The high temperature and high pressure air expands in the second expansion unit 160 and generates a rotational force. At this time, the control unit 170 decouples the connection of the clutch C so that only the second expansion unit 160 is connected to transfer power.

The air exhausted from the second expansion unit 160 is transferred to the first regenerative unit 131 via the eleventh conduit R11. When the temperature of the air measured by the first temperature sensor TS1 in the Determination operation B is greater than or equal to the first temperature, the control unit 170 closes the fourth valve V4 and opens the fifth and sixth valves V5 and V6.

Then, the air output from the storage ST is input to the first regenerative unit 131 via the second, third, and fifth conduits R2, R3, and R5 and heated at the first regenerative unit 131 through heat exchange with the air output from the second expansion unit 160 (First heat exchange operation).

The air heated at the first regenerative unit 131 is transferred to the first expansion unit 140 via the sixth conduit R6. The first expansion unit 140 expands the air inside to generate power (First power generation operation). In this operation, information about a pressure of the air measured by the second pressure sensor PS2 is transferred to the control unit 170. Then, the control unit 170 controls the pressure control device 142 of the first expansion unit 140 according to the pressure. When the pressure is low, the control unit 170 controls the pressure control device 142 so as to decrease an area of an inlet portion of the first expansion unit 140. At this time, the control unit 170 connects the clutch C so that a rotational force generated as the air input to the inside of the first expansion unit 140 is transferred to the outside through the rotational shaft connected to the second expansion unit 160.

The air exhausted from the first expansion unit 140 is input to the second regenerative unit 132 via the seventh conduit R7, and performs heat exchange with the air passing through the eleventh conduit R11 and the first regenerative unit 131 (Second heat exchange operation).

The air output from the first expansion unit 140 and passing through the Second heat exchange operation is input to the heating unit 150 via the eighth conduit R8 and the ninth conduit R9, and is heated at the heating unit 150 (Heating operation).

The air passing through the Heating operation is input to the second expansion unit 160 via the tenth conduit R10. The second expansion unit 160 generates power using the air expanding therein (Second power generation operation).

The air passing through the Second power generation operation passes through the eleventh conduit R11 and is exhausted to the outside after passing through the First and Second heat exchange operations.

When a user inputs a power generation stop command to the control unit 170 in order to stop the generation of electricity, the control unit 170 closes all valves V4-V6 used in the power generation operation and terminates the driving of the first expansion unit 140, the heating unit 150, and the second expansion unit 160, thereby terminating the power generation operation.

Although in the exemplary embodiment the first temperature is set to about 150° C., the exemplary embodiment is not limited thereto. That is, the first temperature may vary according to the internal structure of an overall power generation system and the designer's design intent.

Figure 2:
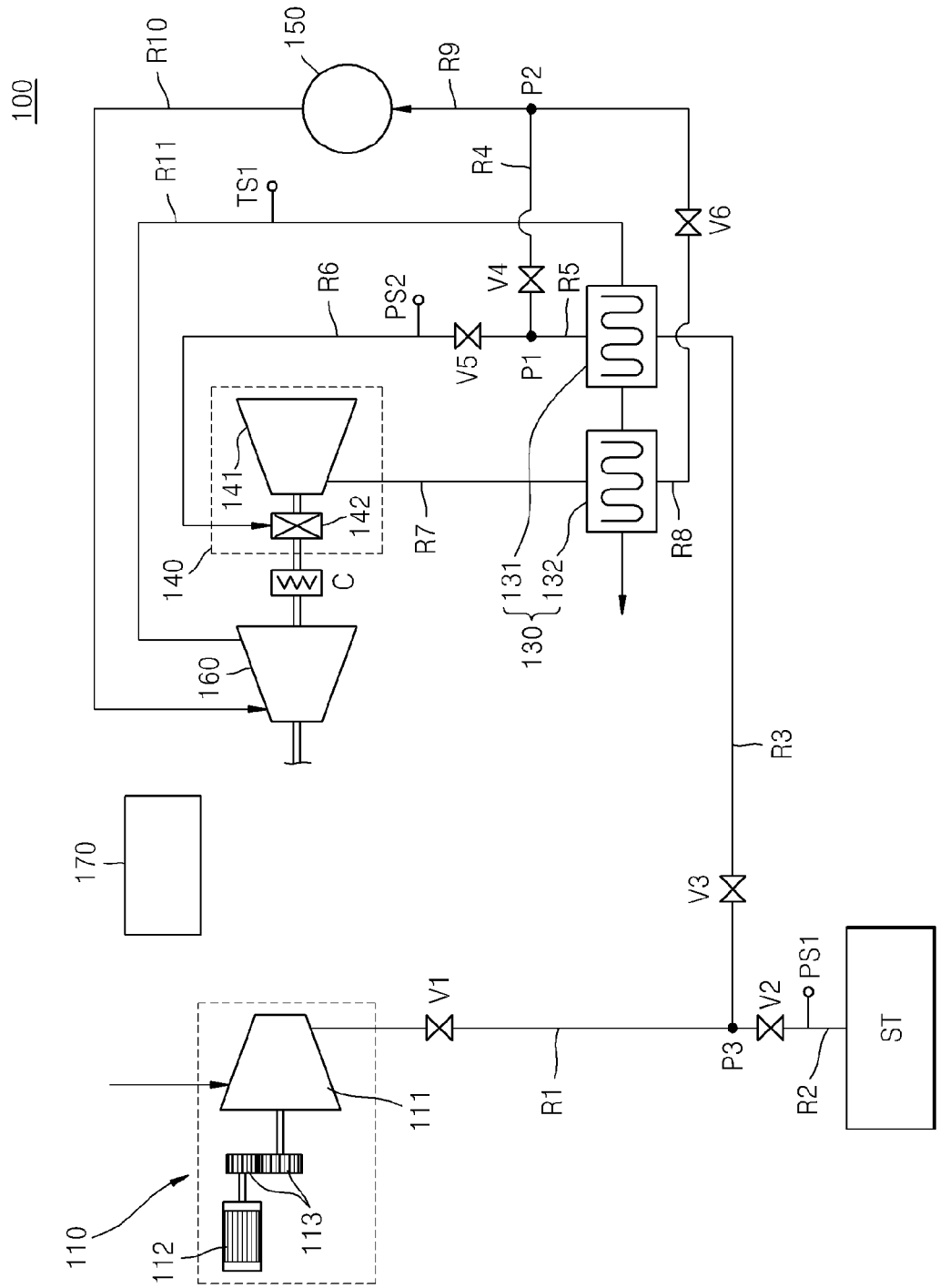
FIG. 2 schematically illustrates a modified exemplary embodiment of the power generation system of FIG. 1.

Also, the structure of the power generation system according to the inventive concept is not limited to the embodiment of FIG. 1. FIG. 2 schematically illustrates a modified example of the power generation system 100 of FIG. 1, according to an exemplary embodiment.

Referring to FIG. 2, an arrangement of the first connection unit P1, the fifth valve V5, and the fifth conduit R5 is different from that of FIG. 1. That is, the first connection unit P1, the fifth valve V5, and the fifth conduit R5 are arranged such that the air output from the storage ST passes through the first connection unit P1, the fifth valve V5, and the fifth conduit R5 after first passing through the first regenerative unit 131.

According to the exemplary embodiment of FIG. 2, even when the temperature of air measured by the first temperature sensor TS1 is lower than the first temperature, by making the air pass through the first regenerative unit 131, the energy of the high temperature gas exhausted from the second expansion unit 160 may be used through heat exchange. That is, the exemplary embodiment has a remarkable effect to increase an overall efficiency of the power generation system 100 by performing heat exchange between all gases exhausted from the storage ST and input to the first regenerative unit 131 via the third conduit R3 and all gases output from the second expansion unit 160 and input to the first regenerative unit 131 via the eleventh conduit R11.

Another embodiment of the exemplary embodiment will be described in detail with reference to FIGS. 3 and 4, mainly based on unique elements from the above-describe embodiment of FIG. 1.

Figure 3:
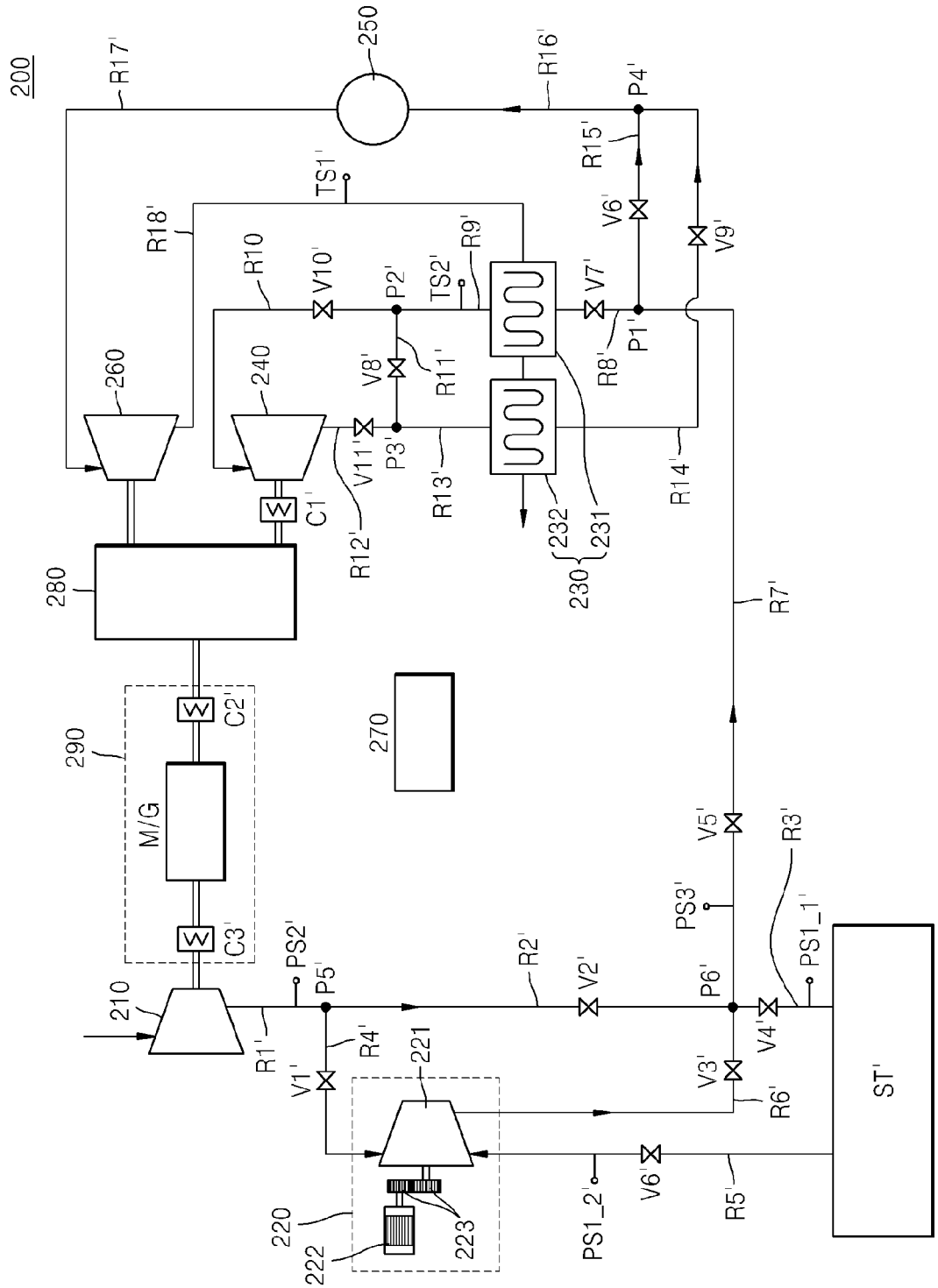
FIG. 3 schematically illustrates a power generation system according to another exemplary embodiment.

FIG. 3 schematically illustrates a power generation system 200 according to another exemplary embodiment. FIG. 4 is a cross-sectional view schematically illustrating the inside of a gear unit illustrated in FIG. 3.

Figure 4:
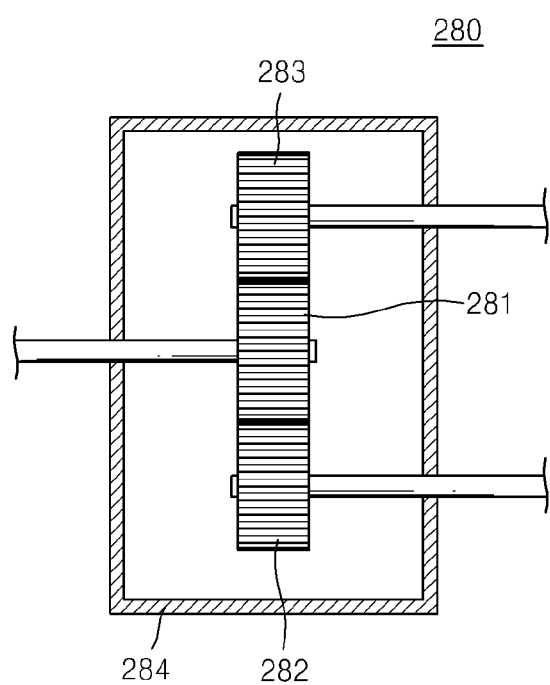
FIG. 4 is a cross-sectional view schematically illustrating an exemplary embodiment of the inside of a gear unit illustrated in FIG. 3.

Referring to FIGS. 3 and 4, the power generation system 200 according to the exemplary embodiment includes a compression unit, a regenerative unit 230, a first expansion unit 240, a heating unit 250, a second expansion unit 260, a control unit 270, a gear unit 280, an electricity generation unit 290, and a storage ST'. Since the power generation system 200 of the exemplary embodiment includes the electricity generation unit 290, the exemplary embodiment may be regarded as an electricity generation system.

The descriptions on the storage ST', the regenerative unit 230, the heating unit 250, and the control unit 270 of the power generation system 200 are similar to the descriptions on the storage ST, the regenerative unit 130, the heating unit 150, and the control unit 170, respectively, of the power generation system 100 according to the embodiment of FIG. 1. Also, the description on gas in the exemplary embodiment is similar to the description on the gas of FIG. 1.

First, the compression unit includes a first compression unit 210 and a second compression unit 220. The first compression unit 210 includes at least one compressor. A turbo compressor, a rotary compressor, or a reciprocating compressor may be used as the at least one compressor, but the exemplary embodiment is not limited thereto. That is, the first compression unit 210 may include a plurality of compressors. In the case of the multiple compressors, the compressors may be arranged in series or in parallel. When a plurality of compressors is included in the first compression unit 210, an intercooler (not shown) may be provided between the respective compressors.

In the exemplary embodiment, the first compression unit 210 compresses air in an atmospheric state to a first pressure. The first pressure corresponds to an optimal pressure ratio of the first compression unit 210, but may be adjusted anytime according to a designer's design intent.

A rotational shaft of the first compression unit 210 is connected to the electricity generation unit 290 including a motor/generator to compress the gas. That is, the power generated from the first expansion unit 240 or 260 is transferred to the electricity generation unit 290 and to the first compression unit 210 to compress the gas. In some cases, the motor/generator works as a motor to operate the first compression unit 210 using electric power. The electricity generation unit 290 will be described below. However, the exemplary embodiment is not limited thereto. For example, since the first compression unit 210 includes its own motor and decelerator, power may be transferred through a separate motor and decelerator to compress the gas.

The second compression unit 220 includes a second compressor 221, a second motor 222, and a second decelerator 223. An inlet portion of the second compression unit 220 is connected to a fourth conduit R4' and a fifth conduit R5', whereas an output portion thereof is connected to a sixth conduit R6', which will be describe later.

The second compressor 221 includes a variable pressure ratio compressor. That is, the second compressor 221 is operated to produce an optimal exhaust pressure by varying a pressure ratio under control of the control unit 270. For example, when the pressure of input gas decreases, the second compressor 221 increases the pressure ratio so that a pressure of the exhausted gas may be maintained substantially constant.

A related art technology may be used as a variable pressure ratio compressor technology applied to the second compressor 221. For example, a technology of varying a pressure ratio by adjusting the speed of a rotational shaft of a compressor or a technology of varying a pressure ratio by adjusting an angle of a vein may be used.

In the exemplary embodiment of FIG. 3, the second compressor 221 is operated to compress air to a second pressure. The second pressure is a pressure that is determined by a designer for an optical efficiency of a power generation system. Accordingly, the second pressure may be adjusted anytime according to the designer's design intent, which will be described later.

The second motor 222 drives the second compressor 221 by receiving power from an electric power network or the electricity generation unit 290. An AC motor or DC motor may be used for the second motor 222.

Although in the exemplary embodiment the second motor 222 is used to drive the second compressor 221, the exemplary embodiment is not limited thereto. For example, the second compressor 221 may compress air by receiving power through a rotational shaft of the first or second expansion units 240 or 260.

The second decelerator 223 transfers the power of the second motor 222 to a shaft of the second compressor 221. In the exemplary embodiment, the second decelerator 223 is embodied by a gear train.

Although in the exemplary embodiment the second compression unit 220 includes the single second compressor 221, the exemplary embodiment is not limited thereto. That is, the second compression unit 220 may include a plurality of second compressors. The second set of compressors may be connected in series or in parallel to each other. Also, while variable pressure ratio compressors may be used for only a few of the second compressors, general fixed pressure ratio compressors may be used for the other second compressors.

The first expansion unit 240 includes a turbine. The gas heated while passing through a first generator 231 expands in the turbine to rotate a rotational shaft of the turbine, thereby generating power.

The second expansion unit 260 includes at least one turbine. The second expansion unit 260 converts an expansion operation of a high temperature and high pressure gas output from the heating unit 250 into rotational motion energy of a rotational shaft of the turbine.

Although in the exemplary embodiment the second expansion unit 260 includes only one turbine, the exemplary embodiment is not limited thereto. That is, the second expansion unit 260 may include a plurality of gas turbines. In this case, the gas turbines may be connected in series or in parallel to each other. A re-heater (not shown) may be provided between the respective gas turbines.

In the exemplary embodiment, the first expansion unit 240 and the second expansion unit 260 are connected in parallel. However, the first expansion unit 240 and the second expansion unit 260 may be connected in series.

The rotational shafts of the first expansion unit 240 and the second expansion unit 260 are connected to the gear unit 280. The structure of the gear unit 280 is illustrated in detail in FIG. 4. The rotational shafts of the first expansion unit 240 and the second expansion unit 260, respectively connected to gears 282 and 283 located in the gear unit 280, are rotated. The gears 282 and 283 are engaged with another gear 281 arranged therebetween. The gears 281, 282, and 283 engaged with one another may rotate in unison together. The gear ratios of the gears 281, 282, and 283 may be set such that the first expansion unit 240 and the second expansion unit 260 may have different rotational speeds. That is, since not only the structures of the first expansion unit 240 and the second expansion unit 260, but also the temperature and pressure of the gas input to the first expansion unit 240 and the second expansion unit 260 are different from each other, the first expansion unit 240 and the second expansion unit 260 may also have different rotational speeds at which an optimal efficiency is produced. Thus, in order for the first expansion unit 240 and the second expansion unit 260 to be operated at optimal rotational speeds to exert optimal efficiencies, the gears connected to the first expansion unit 240 and the second expansion unit 260 may have different gear ratios.

Also, an output of the first expansion unit 240 varies according to the state of an input gas. If the first expansion unit 240 is operated at a rotational speed that is different from a designed optimal rotational speed, an overall output may be rather decreased due to the first expansion unit 240. To address this concern, a first clutch C1' for selectively preventing the rotational force of the first expansion unit 240 from being transferred to the gear unit 280 may be installed on the rotational shaft of the first expansion unit 240.

The electricity generation unit 290 receives power from the gear unit 280 to generate electricity. The electricity generation unit 290 of the exemplary embodiment includes a motor/generator, a second clutch C2', and a third clutch C3'. The motor/generator is connected to two shafts, and the second and third clutches C2' and C3' are installed on the respective shafts. One end of the shaft on which the second clutch C2' is installed is connected to the gear 281 of the gear unit 280 and rotates. The other end of the shaft on which the third clutch C3' is installed is connected to the first compression unit 210 and rotates.

Although most of the electricity generated by the electricity generation unit 290 is transferred to the outside, part of the electricity is used to drive the first compression unit 210 and another part is transferred to the second motor 222 of the second compression unit 220 to be used as energy for driving the second compression unit 220.

Another configuration of a plurality of conduits of the power generation system 200 will be described in detail with reference to FIG. 3. In the configuration of the plurality of conduits related to a gas compression operation according to the exemplary embodiment, a plurality of conduits from the first compression unit 210 to a first connection unit P1' includes a first conduit R1', a second conduit R2', a third conduit R3', the fourth conduit R4', the fifth conduit R5', the sixth conduit R6', and a seventh conduit R7'.

The first conduit R1' connects the first compression unit 210 and the fifth connection unit P5'. The second conduit R2' connects the fifth connection unit P5' and the sixth connection unit P6'. The third conduit R3' connects the sixth connection unit P6' and the storage ST'.

Also, the fourth conduit R4' connects the fifth connection unit P5' and the second compression unit 220. The fifth conduit R5' connects the storage ST' and the second compression unit 220. The sixth conduit R6' connects the second compression unit 220 and the sixth connection unit P6'. The seventh conduit R7' connects the sixth connection unit P6' and the first connection unit P1'.

A second pressure sensor PS2' is arranged on the first conduit R1'. A second valve V2' is arranged on the second conduit R2'. A fourth valve V4' and a first pressure sensor PS1_1' are arranged on the third conduit R3'. A first valve V1' is arranged on the fourth conduit R4'. A sixth valve V6' and a second pressure sensor PS1_2' are arranged on the fifth conduit R5'. A third valve V3' is arranged on the sixth conduit R6'. A fifth valve V5' and a third pressure sensor PS3' are arranged on the seventh conduit R7'.

Although in the exemplary embodiment the first and second pressures sensors PS1_1' and PS1_2' are arranged on the third and fifth conduits R3' and R5', respectively, the exemplary embodiment is not limited thereto. That is, the number of the first pressure sensors is one or more and there are no other conditions except that the first pressure sensor is installed at a position where the pressure of the storage ST' is measured. For example, only one first pressure sensor may be installed only on the third conduit R3'.

The configuration of a plurality of conduits related to the power and electric power generation operations using compressed gas will be described below.

According to the exemplary embodiment, a plurality of conduits from the first connection unit P1' to a second generative part 232 includes an eighth conduit R8', a ninth conduit R9', a tenth conduit R10', an eleventh conduit R11', a twelfth conduit R12', a thirteenth conduit R13', a fourteenth conduit R14', a fifteenth conduit R15', a sixteenth conduit R16', a seventeenth conduit R17', and an eighteenth conduit R18'.

The eighth conduit R8' connects the first connection unit P1' and the first regenerator 231. The ninth conduit R9' connects the first regenerator 231 and the second connection unit P2'. The tenth conduit R10' connects the second connection unit P2' and the first expansion unit 240.

The eleventh conduit R11' connects the second connection unit P2' and the third connection unit P3'. The twelfth conduit R12' connects the first expansion unit 140' and the third connection unit P3'. The thirteenth conduit R13' connects the third connection unit P3' and the second regenerator 232. The fourteenth conduit R14' connects the second regenerator 232 and the fourth connection unit P4'.

The fifteenth conduit R15' connects the first connection unit P1' and the fourth connection unit P4'. The sixteenth conduit R16' connects the fourth connection unit P4' and the heating unit 250. The seventeenth conduit R17' connects the heating unit 250 and the second expansion unit 260. The eighteenth conduit R18' connects the second expansion unit 260 and the first regenerator 231.

A seventh valve V7' is arranged on the eighth conduit R8'. A second temperature sensor TS2' is arranged on the ninth conduit R9'. A tenth valve V10' is arranged on the tenth conduit R10'. An eighth valve V8' is arranged on the eleventh conduit R11'. An eleventh valve V11' is arranged on the twelfth conduit R12'. A ninth valve V9' is arranged on the fourteenth conduit R14'. A sixth valve V6' is arranged on the fifteenth conduit R15'. A first temperature sensor TS1' is arranged on the R18'.

Although the configurations of the conduits and sensors according to the exemplary embodiment are described in the above, the configurations of internal conduits and pressure sensors of a power generation system according to the exemplary embodiment are not limited thereto. That is, the configurations of internal conduits and sensors of a power generation system may be diversely modified according to the types and specifications of internally arranged devices.

The operation of the power generation system 200 according to the exemplary embodiment will be described below with reference to FIG. 3. As described above, since the composition of the compressed gas according to the exemplary embodiment is the same as that of air, the following description is based thereon.

When a user inputs a compressed gas storing command to the control unit 270, the control unit 270 determines whether a pressure of the storage ST' measured by the first pressure sensor PS1_1' is greater than or equal to a first pressure, for example, about 30 bars in the exemplary embodiment (Determination operation A'). If the measured pressure is less than the first pressure, the control unit 270 closes the first valve V1', the third valve V3', the fifth valve V5', and the sixth valve V6' and opens the second valve V2' and the fourth valve V4'. The control unit 270 makes the second clutch C2' disconnected and the third clutch C3' connected, and operates the motor/generator as a motor. The motor/generator drives the first compression unit 210 to compresses air (Compression operation). The compressed air in the Compression operation is input to the storage ST' after passing through the first conduit R1', the second conduit R2', and the third conduit R3' (Storage operation). The second pressure sensor PS2' measures the pressure of the first conduit R1' and data is transferred to the control unit 270.

When the pressure of the storage ST' measured by the first pressure sensor PS1_1' reaches the first pressure, for example, approximately 30 bars, the control unit 270 closes the second valve V2' and opens the first valve V1' and the third valve V3', and drives the second compression unit 220. Then, the air compressed by the first compression unit 210 is transferred to the second compression unit 220 to be further compressed. The further compressed air passes through the sixth conduit R6' and the third conduit R3' and is stored in the storage ST' (Further compression storage operation). In this case, the transfer path of the compressed air is sequentially the first conduit R1', the fourth conduit R4', the second compressor 221, the sixth conduit R6', the third conduit R3', and the storage ST'. In this case, the closed valves are the second valve V2', the sixth valve V6', and the fifth valve V5', whereas the open valves are the first valve V1', the third valve V3', and the fourth valve V4'.

If the pressure of the storage ST' measured by the first pressure sensor PS1_1' in the Determination operation A' reaches a second pressure, for example, about 60 bars in the exemplary embodiment, the control unit 270 closes the fourth valve V4' and keeps the storage ST' from the outside, thereby maintaining an internal pressure. In addition, the control unit 270 terminates the driving of the first compression unit 210 and the second compression unit 220, thereby terminating the Compression operation and the Storage operation.

Although in the exemplary embodiment the first and second pressures are respectively set to be approximately 30 bars and 60 bars, respectively, the exemplary embodiment is not limited thereto. That is, the first and second pressures may vary according to the internal structure of an overall power generation system and a design intent of a designer. In particular, the first and second pressures may vary according to performance of the first and second compression units.

Next, in the power generation operation, when a user inputs a power generation command to the control unit 270, the control unit 270 opens the fourth and fifth valves V4' and V5' and closes the second, third, and sixth valves V2', V3', and V6', so that the compressed air stored in the storage ST' is transferred to the first connection unit P1' via the third and seventh conduits R3' and R7'. Simultaneously or subsequently, the control unit 270 determines whether a temperature of the air measured by the first temperature sensor TS1' is greater than or equal to a first temperature that is approximately 150° C. in the exemplary embodiment (Determination operation B'). When the measured temperature is lower than the first temperature, the control unit 270 closes the seventh and ninth valves V7' and V9' and opens the sixth valve V6'.

The compressed air arrived at the first connection unit P1' is input to the heating unit 250 via the fifteenth and sixteenth conduits R15' and R16'. The compressed air heated to a high temperature at the heating unit 250 is input to the second expansion unit 260 via the seventeenth conduit R17'. The high temperature and high pressure air expands in the second expansion unit 260 and generates a rotational force that is transferred to the electricity generation unit 290 via the gear unit 280. At this time, the control unit 270 makes the first and third clutches C1' and C3' disconnected and the second clutch C2' connected. In some cases, however, the control unit 270 may connect the third clutch C3' to use the generated power for the compression of gas.

The air exhausted from the second expansion unit 260 is transferred to the first regenerative unit 231 via the eighteenth conduit R18'. In doing so, when the temperature of the air measured by the first temperature sensor TS1' in the Determination operation B' is greater than or equal to the first temperature, the control unit 270 closes the sixth valve V6' and opens the seventh valve V7'. Then, the air output from the storage ST' passes through the first regenerative unit 231 via the third, seventh, and eighth conduits R3', R7', and R8', and performs heat exchange with the air output from the second expansion unit 260 (First heat exchange operation).

Then, the air passes through the ninth conduit R9' and arrives at the second connection unit P2'. At this time, the control unit 270 determines whether the temperature of the air measured by the second temperature sensor TS2' is greater than or equal to the second temperature, for example, about 100° C. in the exemplary embodiment. When the measured temperature is lower than the second temperature, the control unit 270 closes the sixth, tenth, and eleventh valves V6', V10', and V11' and opens the seventh, eighth, and ninth valves V7', V8', and V9'. The air is transferred from the second connection unit P2' sequentially to the eleventh, thirteenth, fourteenth, sixteenth, seventeenth, and eighteenth conduits R11', R13', R14', R16', R17', and R18'.

When the temperature of the air measured by the second temperature sensor TS2' in a determination operation C' reaches the second temperature, the control unit 270 closes the eighth valve V8' and opens the tenth and eleventh valves V10' and V11'. Then, the air passes through the first expansion unit 240 and the control unit 270 connects the first clutch C1' so that the power generated by the first expansion unit 240 is transferred to the electricity generation unit 290 via the gear unit 280, thereby generating power (First power generation operation or First electric power generation operation).

The air exhausted from the first expansion unit 240 passes through the second regenerative unit 232 via the twelfth and thirteenth conduits R12' and R13' and performs heat exchange with the air exhausted from the second expansion unit 260 and passing through the first regenerative unit 231 (Second heat exchange operation). The air passing through the second heat exchange operation arrives at the heating unit 250 via the fourteenth and sixteenth conduits R14' and R16'. The air is combusted with fuel in the heating unit 250 to thus generate a combustion gas (Heating operation). The combustion gas is input to the second expansion unit 260 via the seventeenth conduit R17' to generate power (Second power generation operation). The combustion gas passing through the first and second regenerative units 231 and 232 via the eighteenth conduit R18' transfers heat to newly input compressed air through the First and Second heat exchange operations and is exhausted to the outside.

When a user inputs a power generation stop command to the control unit 270 in order to stop the generation of electricity, the control unit 270 closes all valves V6'-V11' used in the power generation operation and terminates the driving of the first expansion unit 240, the heating unit 250, and the second expansion unit 260, thereby terminating the power generation operation.

Although in the exemplary embodiment the first and second temperatures are respectively set to be approximately 150° C. and 100° C., respectively, the exemplary embodiment is not limited thereto. That is, the first and second temperatures may vary according to the internal structure of an overall power generation system and the designer's design intent.

As the compressed gas is exhausted from the storage ST', the pressure of the compressed gas output from the storage ST' gradually decreases. In the exemplary embodiment, if the pressure of the exhausted compressed gas does not reach a predetermined exhaust pressure that is 50 bars, it does not reach an available pressure range for operating the first and second expansion units 240 and 260 so that loss of energy is rapidly increased.

Accordingly, in the exemplary embodiment, when the pressure of the compressed gas measured by the first pressure sensor PS1_1' decreases reaching about 55 bars, the control unit 270 closes the fourth valve V4' and opens the sixth and third valves V6' and V3', and drives the second compressor 221. At this time, the second valve V2' is closed and the compressed gas sequentially passes through the fifth conduit R5', the second compressor 221, the sixth conduit R6', and the seventh conduit R7' in order. Then, as described above, the compressed gas passes through the power generation operation.

Although the pressure of the compressed gas in the storage ST' decreases, the pressure of the compressed gas entering the first connection unit P1' is maintained between approximately 50-60 bars due to pressure ratio variable driving of the second compressor 221 that is a variable pressure ratio compressor. The pressure range of approximately 50-60 bars is a preset range for an optimal operation of the first expansion unit 240. In this case, as the pressure of the compressed gas in the storage ST' decreases, a pressure ratio of the second compressor 221 increases. Thus, the first pressure sensor PS1_2' transmits pressure data of the compressed gas output from the storage ST' to the control unit 270. Also, the third pressure sensor PS3' transmits the pressure data of the compressed gas entering the first connection unit P1'. Thus, the control unit 270 may accurately perform control of the second compressor 221.

Although it is described in the exemplary embodiment that the pressure of the compressed gas entering the first connection unit P1' is maintained in a range of approximately 50-60 bars for an optimal operation of the first expansion unit 240, the exemplary embodiment is not limited thereto.

Also, in the exemplary embodiment, when the pressure of the compressed gas measured by the first pressure sensor PS1_1' does not reach 55 bars, the control unit 270 gradually closes the fourth valve V4' and opens the sixth valve V6' and the third valve V3', and drives the second compressor 221. The compressed gas pressure of 55 bars is defined to be a third pressure. The third pressure is determined by a designer for an optimal efficiency of a power generation system and may be adjusted according to the designer's design intent. That is, the third pressure is not limited to 55 bars. For example, the third pressure may be 52 bars, 53 bars, 57 bars, and etc. Also, as described above, since the optimal pressure range of the compressed gas entering the heating unit 250 may vary according to the type and performance of an installed turbine, the third pressure may vary according thereto. The fourth valve V4' may be closed not gradually but instantly at the operation time point of the control unit 270. That is, the valve control of the control unit 270 may be appropriately adjusted according to the state of the power generation system 200 or an internal correction program.

As described above, since the power generation system 200 includes the second compressor 221 in the form of a variable pressure ratio compressor and the second compressor 221 used for both Storage operation and the power generation operation, an additional compressor is not needed so that a power generation system having an efficient structure may be embodied.

Also, the power generation system 200 according to the exemplary embodiment, since the gas additionally compressed by the second compressor 221 is transferred to the heating unit 250, the capacity and size of the storage ST' may be reduced and simultaneously the power generation system 200 may be efficiently operated. Therefore, installation costs and construction costs of the storage ST' may be reduced.

A related art power generation system requires a high pressure combustor for combusting a high pressure gas, which is difficult to manufacture and is very costly. In contrast, the power generation system 200 solves the problems by making the high pressure gas pass through the first expansion unit 240 first to be a low pressure gas and then combusting the low pressure gas in the heating unit 250. The first expansion unit 240 includes a turbine designed to be appropriate for a high pressure and the second expansion unit 260 includes a turbine designed to be appropriate for a low pressure, so that efficiency is increased by using a turbine optimized for each pressure range.

Since the first and second expansion units 240 and 260 have different performance and operational pressure ranges, the rotation speed at which each expansion unit has an optimal efficiency may be different from each other. Thus, in the exemplary embodiment, the first and second expansion units 240 and 260 are connected in parallel and power is transferred to another shaft through the gear unit 280. The gear unit 280 is connected to each of the first and second expansion units 240 and 260 and includes the gears 282 and 283 having different gear ratios so that the first and second expansion units 240 and 260 may have different rotation speeds. Thus, since each of the first and second expansion units 240 and 260 is operated at an optimal rotational speed, the power generation system 200 has a higher efficiency.

It is easy to design the heating unit 250 because the heating unit 250 is to combust a relatively low pressure gas. When the gas is input to the heating unit 250 from the first connection unit P1' through the fifteenth conduit R15' and the sixteenth conduit R16', to prevent a high pressure air from being input directly to the heating unit 250, the sixth valve V6' may have a characteristic of reducing pressure by passing the gas, like a throttling valve, or an additional throttle valve may be installed on the fifteenth conduit R15'.

The electricity generation unit 290 includes the motor/generator (M/G), which may be sometimes used as a generator for generating electricity by receiving power from the expansion unit or as a motor for operating the first compression unit 210. Thus, may be more efficiently used and part costs may be reduced.

Also, in the control unit 270, since a plurality of valves are controlled according to the state of gas in each part and the progress path of the gas according thereto is controlled, the power generation system 200 according to the exemplary embodiment may have a high efficiency. Also, since heat is collected from the high temperature exhaust gas exhausted from the second expansion unit 260 using the two parts of the regenerative unit 230, a high efficiency may be expected.

As described above, according to the exemplary embodiment, a high efficient power generation system may be realized.

The power generation system according to the exemplary embodiment may be used for an industrial field for storing compressed gas and generating power using the stored compressed gas when necessary.

While this invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in a descriptive sense only and not for purposes of limitation.

What is claimed is:

1. A power generation system comprising:
a compression unit configured to compress a gas;
a storage configured to store the compressed gas output from the compression unit;
a first expansion unit configured to generate first power and outputs a first exhaust gas;
a heating unit configured to heat at least the stored gas output from the storage;
a second expansion unit configured to generate second power and outputs a second exhaust gas;
a first regenerator configured to perform a first heat exchange between the second exhaust gas and the stored gas output from the storage, to generate a first heat-exchange gas used to generate the first power and a first regenerator gas; and
a second regenerator configured to perform a second heat exchange between the first exhaust gas and the first regenerator gas, to generate a second heat-exchange gas which is input to the heating unit in order to generate the second power after heated at the heating unit,
wherein the second exhaust gas output from the second expansion unit is configured to sequentially pass through the first regenerator and the second regenerator,
wherein if it is determined that a temperature of the second exhaust gas is greater than or equal to a first temperature, the heating unit is disconnected from the storage so that the stored gas output from the storage is transferred not to the heating unit but to the first regenerator to be heated thereat through the first heat exchange to generate the first heat-exchange gas, and
wherein if it is determined that a temperature of the first heat-exchange gas is lower than a second temperature, the first heat-exchange gas from the first regenerator is transferred to the second regenerator instead of the first expansion unit so that the second heat-exchange is performed between the first regenerator gas and the first heat-exchange gas instead of between the firs regenerator gas and the first exhaust gas.

2. The power generation system of claim 1, wherein the first and second expansion units are selectively coupled so that the first power is transferred to an outside through the second expansion unit, and
wherein if it is determined that the first power is less than a power transfer threshold, the first expansion unit is decoupled from the second expansion unit so that the first power is not transferred to the second expansion unit.

3. The power generation system of claim 1, wherein the second expansion unit is configured to generate a rotational force, using the stored gas output from the storage and heated at the heating unit, before the first heat exchange is performed.

4. The power generation system of claim 1, wherein, if it is determined that the temperature of the second exhaust gas is not greater than or equal to a first temperature, the stored gas output from the storage is transferred to the heating unit, heated at the heating unit, and transferred to the second expansion unit to generate a rotational force thereat before the first heat exchange is performed.

5. The power generation system of claim 1, wherein if it is determined that the stored gas has a pressure less than an operational threshold, the storage is disconnected from the first regenerator and the heating unit, and receives the compressed gas output from the compression unit, and
wherein if it is determined that the stored gas has a pressure greater than or equal to the operational threshold, the storage is disconnected from the compression unit and connected to at least one of the heating unit and the first regenerator.

6. The power generation system of claim 1, further comprising a cooling unit configured to cool the compressed gas.

7. The power generation system of claim 1, wherein the compressor is configured to use at least one of the first power and the second power to compress the gas.

8. The power generation system of claim 1, further comprising a gear unit which is connected to a rotational shaft of the first expansion unit and a rotational shaft of the second expansion unit, and which is configured to transfer a rotational force received from the rotational shafts to another rotational shaft.

9. The power generation system of claim 1, further comprising a coupler which is configured to couple the first expansion unit and the second expansion unit to selectively connect or disconnect transfer of the first power generated at the first expansion unit to an outside through the second expansion unit.

10. The power generation system of claim 1, wherein the compression unit comprises:
a first compressor configured to first compresses compress the gas until the gas reaches a first pressure; and
a second compressor configured to receive and second compresses the first-compressed gas until a pressure of the second compressed gas reaches a second pressure,
wherein if the second compressed gas reaches the second pressure, the storage is disconnected from the compression unit and connected to at least one of the heating unit and the first regenerator.

11. The power generation system of claim 1, further comprising an electricity generation unit configured to convert power generated by the first or second expansion unit into electric power.

12. The power generation system of claim 1, wherein the second regenerator is discrete from the first regenerator.

13. The power generation system of claim 3, wherein when the rotational force is generated at the second expansion unit, the second expansion unit is decoupled from the first expansion unit.

14. The power generation system of claim 4,
wherein if it is determined that a pressure of the first heat-exchange gas is in a predetermined range, the first expansion unit is coupled to the second expansion unit so that the first power is transferred to an outside through the second expansion unit.

15. The power generation system of claim 4, wherein if it is determined that the temperature of the second exhaust gas is greater than or equal to the first temperature, the first expansion unit is configured to receive the first heat-exchange gas, generates the first power, and outputs the first exhaust gas to the second regenerator for the second heat-exchange so that the second heat-exchange gas is transferred to the heating unit, heated thereat, and transferred to the second expansion unit to generate the second power.

16. The power generation system of claim 8, wherein the gear unit comprises:
a first gear connected to the rotational shaft of the first expansion unit;
a second gear connected to the rotational shaft of the second expansion unit; and
a third gear engaged with the first and second gears.

17. The power generation system of claim 10, wherein if the second compressed gas is determined to have decreased from the second pressure to a third pressure, the stored gas is re-compressed by the second compressor and transferred to the at least one of the heating unit and the first regenerator.

18. A power generation method comprising:
compressing, by a compression unit, a gas;
storing the compressed gas in a storage;
generating, by a first expansion unit, first power and outputting a first exhaust gas;
heating, by a heating unit, at least the stored gas output from the storage;
generating, by a second expansion unit, second power and outputting a second exhaust gas;
performing a first heat exchange, by a first regenerator, between the second exhaust gas and the stored gas output from the storage, to generate a first heat-exchange gas used to generate the first power and a first regenerator gas;
performing a second heat exchange, by a second regenerator, between the first exhaust gas and the first regenerator gas, to generate a second heat-exchange gas which is input to the heating unit to generate the second power after heating the second heat-exchange gas; and
sequentially passing the second exhaust gas output from the second expansion unit through the first regenerator and the second regenerator,
wherein if it is determined that a temperature of the second exhaust gas is greater than or equal to a first temperature, disconnecting the heating unit from the storage so that the stored gas output from the storage is transferred not to the heating unit but to the first regenerator to be heated thereat through the first heat exchange to generate the first heat-exchange gas, and
wherein if it is determined that a temperature of the first heat-exchange gas is lower than a second temperature, transferring the first heat-exchange gas from the first regenerator to the second regenerator instead of the first expansion unit so that the second heat-exchange is performed between the first regenerator gas and the first heat-exchange gas instead of between the first regenerator gas and the first exhaust gas.

19. The power generation method of claim 18, wherein if it is determined that the temperature of the second exhaust gas is not greater than or equal to a first temperature, heating the stored gas output from the storage to generate a rotational force thereat before the first heat exchange is performed.

20. The power generation method of claim 18, wherein the second regenerator is discrete from the first regenerator.

21. The power generation method of claim 19, wherein if it is determined that the temperature of the second exhaust gas is greater than or equal to the first temperature, using the stored gas output from the storage to generate the first heat-exchange gas which is used to generate the first power, and using the first exhaust gas for the second heat-exchange and heated to generate the second power.

* * * * *